United States Patent [19]

Sutton

[11] Patent Number: 4,482,108
[45] Date of Patent: Nov. 13, 1984

[54] TILT WING SHORT TAKEOFF AIRCRAFT AND METHOD

[75] Inventor: Richard C. Sutton, Bellevue, Wash.

[73] Assignee: The Boeing Company, Seattle, Wash.

[21] Appl. No.: 451,654

[22] PCT Filed: Sep. 29, 1982

[86] PCT No.: PCT/US82/01357

§ 371 Date: Sep. 29, 1982

§ 102(e) Date: Sep. 29, 1982

[87] PCT Pub. No.: WO84/01341

PCT Pub. Date: Apr. 12, 1984

[51] Int. Cl.³ ............... B64C 15/12; B64C 29/00; B64C 15/14; B64C 3/38
[52] U.S. Cl. ............... 244/12.4; 244/23 B; 244/46; 244/48; 244/56
[58] Field of Search ........... 244/7 C, 12.1, 12.3, 244/12.4, 12.5, 15, 23 R, 23 B, 23 D, 46, 48, 52, 55, 56

[56] References Cited

U.S. PATENT DOCUMENTS

| | | | |
|---|---|---|---|
| 2,007,319 | 7/1935 | Wurth | 244/14 |
| 2,015,150 | 9/1935 | Maxwell | 244/7 C |
| 2,063,030 | 12/1936 | Crouch | 244/12 |
| 2,504,767 | 4/1950 | Wallis | 244/46 |
| 2,657,882 | 11/1953 | Perry | 244/48 |
| 2,695,144 | 11/1954 | Woods | 244/46 |
| 2,699,300 | 1/1955 | Trotter et al. | 244/46 |
| 2,884,633 | 4/1959 | Stahmer | 244/12 |
| 2,941,752 | 6/1960 | Gluhareff | 244/46 |
| 2,973,166 | 2/1961 | Stahmer | 244/23 |
| 3,190,583 | 6/1965 | Stoppe | 244/48 |
| 3,206,146 | 9/1965 | Toms | 244/46 |
| 3,666,209 | 5/1972 | Taylor | 244/7 C |
| 3,884,435 | 5/1975 | Croy et al. | 244/46 |
| 3,948,469 | 4/1976 | Brown | 244/55 |
| 4,116,405 | 9/1978 | Bacchi et al. | 244/12.4 |

FOREIGN PATENT DOCUMENTS 136119 6/1947 Australia .
907590 10/1962 United Kingdom .

Primary Examiner—Galen L. Barefoot
Attorney, Agent, or Firm—Delbert J. Barnard; Eugene O. Heberer

[57] ABSTRACT

A short takeoff and landing aircraft (10) and vertical-/short takeoff and landing aircraft (10), having upper surface blowing engines (12, 14) on gull-shaped wings (24, 26) which may be tilted and translated by a variable incidence translation device (52). The translation means (80, 62, 64) is adapted to provide center of gravity travel trim and critical engine out moment trim. Thrust vectoring of the upper surface blowing engines is accomplished by a combination of the upper surface blowing and wing tilt, and vectoring of lower lift/boost engines (124, 126) is accomplished by swiveling nozzles (138, 140). Critical engine out lateral trim is accomplished by a combination of airplane bank and differential vectoring by the lower lift/boost engines (124, 126).

10 Claims, 9 Drawing Figures

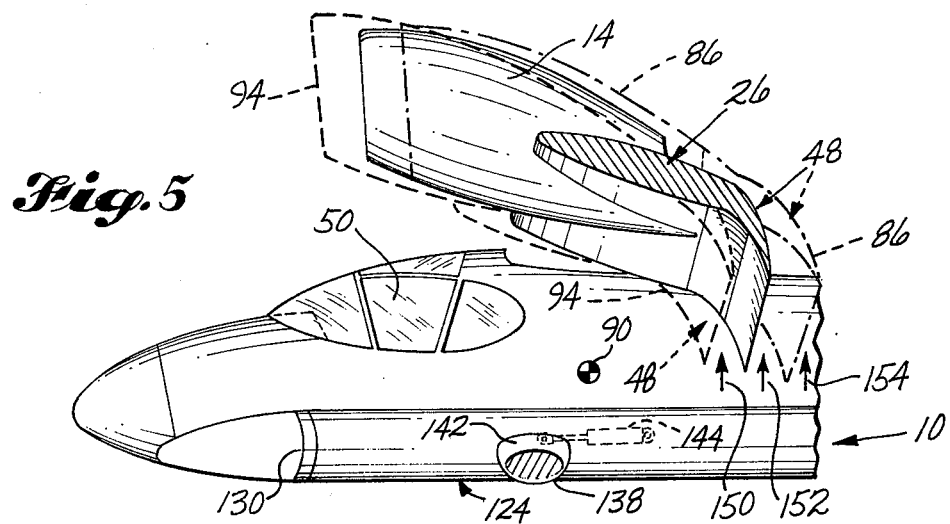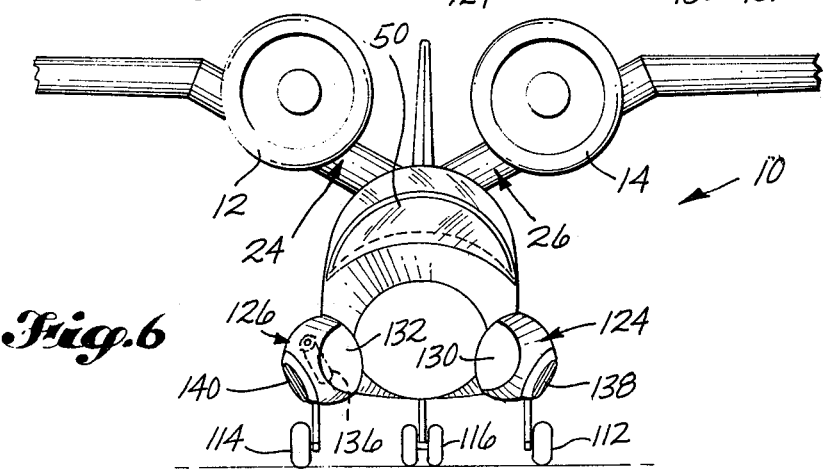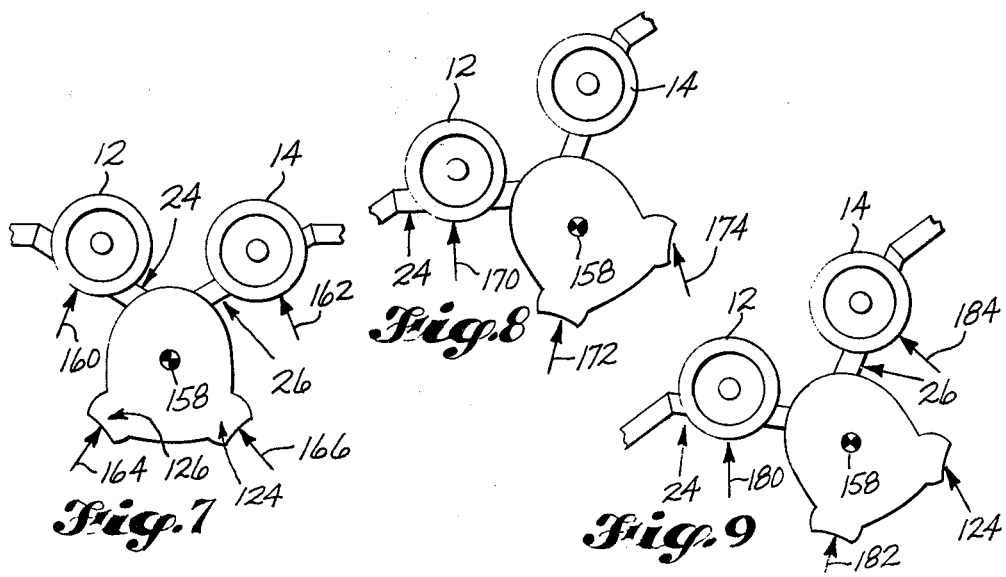

TILT WING SHORT TAKEOFF AIRCRAFT AND METHOD

DESCRIPTION

1. Technical Field

The invention relates to a short takeoff and landing (STOL) or vertical short takeoff and landing (V/STOL) aircraft in which the engines are positioned upwardly on the wings to permit upper surface blowing, that is, jet exhaust over the wings.

2. Background Art

Known prior art subsonic STOL and V/STOL aircraft designs all had the following disadvantages and/or problems: extensive mechanical transmission and cross-shafting apparatus; exotic vectoring or nacelle tilt schemes; new engine and/or low pressure ratio fan development requirements; engine out control; and poor mission match.

A search of the patent literature discloses a number of systems which, generally speaking, indirectly relate to some of the problems discussed above with respect to the prior art. For example, U.S. Pat. No. 2,007,319 discloses an engine for driving a propeller and having an auxiliary wing attached, centered above the aircraft wing, the engine propeller and auxiliary wing being tiltable to provide variable lifting power or to meet peculiar conditions of operation, either while the airplane is on the ground or in flight.

U.S. Pat. No. 2,657,882 discloses an airplane wing support structure which automatically compensates or neutralizes improper manipulation of the airplane so that the angle of attack of the wing is always maintained within predetermined close limits so that control and lift of the plane are maintained at all times.

In U.S. Pat. No. 2,941,752 a trim surface in an aircraft is located forwardly of the center of gravity so as to be effective only at flight attitudes in which excessive stability is available and is of such size and so located relative to the center of gravity of the wing as to permit attainment of the required amount of stability at high values of lift coefficient. The trim surface is a retractable auxiliary airfoil.

In U.S. Pat. No. 3,190,583 an airplane is disclosed having one or more adjustable airfoil surfaces which may be disposed to shorten the distance required for takeoff as well as landing of the airplane. When in flight, the airfoil surfaces may be positioned to increase or decrease the lift.

The following patents disclose systems remote from the present invention: U.S. Pat. Nos. 2,015,150; 2,063,030; 2,504,767; 2,695,144; 2,699,300; 2,884,633; 2,941,752; 2,973,166; 3,190,583; 3,206,146; 3,884,435.

DISCLOSURE OF THE INVENTION

The present invention is comprised of an aircraft having gull-shaped wings with turbofan engines on each of the ascending portions of the gull-shaped wings and has turbojet lift/boost engines, one on each side of the lower fuselage.

Each wing is adapted to be tilted and translated by a respective varying incidence and translation device.

By proper placement of the engines, all vertical takeoff and landing and short takeoff and landing trim and control moments can be handled with critical engine failure. The net vertical takeoff thrust/engine installed weight for the present invention is of the order 5.5 compared to about 4 for the prior art cross-shafted designs.

In the present invention the wing tilt feature provides additional vectoring capability needed for vertical takeoff and landing; that is, the wing tilt requirement is about 30° to provide a thrust vectoring capability of about 110°. The wing translation provides a center of gravity travel trim and critical engine out moment trim. Thrust vectoring of turbofan engines is accomplished by a combination of upper surface blowing and wing tilt while the lift/boost lower turbojet engines are vectored by swiveling nozzles, the swiveling being made possible by variably directed cascades or ball and socket, rotatable nozzles. Critical engine out lateral trim is accomplished by a combination of airplane bank and differential vectoring by the lift/boost engines.

Synergistically, the variable incidence, translating wing, according to the invention, allows the incorporation of a light, short, tandem landing gear and smaller horizontal tail because nose wheel rotation is not required. The attendant weight saving compensates for the variable incidence and translation mechanism provided in the invention.

According to the invention, for example, two upper surface blowing turbofan engines, for example, TF34, and two turbojet lift/boost engines, for example, RB162, are available for lifting a vertical takeoff aircraft weight on the order of 32,000 lbs., and a critical engine out vertical landing weight of 23,000 lbs. is possible.

Estimates of operating weight differences suggest that an operating weight of 20,000 lbs. compared to 27,000 lbs. for prior art complex concepts is possible. At 20,000 lbs., the engine out lift thrust of 24,000 lbs. for emergency vectored landing is quite adequate, and a normal mission vertical takeoff weight of 32,000 lbs. provides a 12,000 lb. useful load margin.

The present invention provides a concept which embodies excellent short takeoff and landing or short takeoff and vertical landing qualities through induced lift, a quality considered mandatory for successful V/STOL aircraft.

It has been found that during the varying of the incidence and translating of the wings and of the upper surface blowing engines there are no high angle of attack inlet flow problems and that there are a low distortion and high recovery. Further, because the upper surface blowing engines are above the wing and are close to the center line, induced moments due to differential thrust are low, and aerodynamic interference with the fuselage is minimal.

Further advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings which are for illustrative purposes:

FIG. 5 is a fragmentary elevational view of the aircraft, illustrating tilted and various translated positions of the wings and engines according to the invention;

FIG. 6 is a front elevational view of the aircraft;

FIG. 7 is a fragmentary view of the aircraft illustrating the vectoring of the engines when all engines are operating normally;

FIG. 8 illustrates a position in which the aircraft is laterally trimmed when one of the wing engines is out and illustrates the vectoring of the other three operating engines; and FIG. 9 is a view illustrating the trim and vectoring of the aircraft engines when the two upper engines are operating and the lift/boost engine on the right is not operating.

BEST MODE FOR CARRYING OUT THE INVENTION

Figure 1:
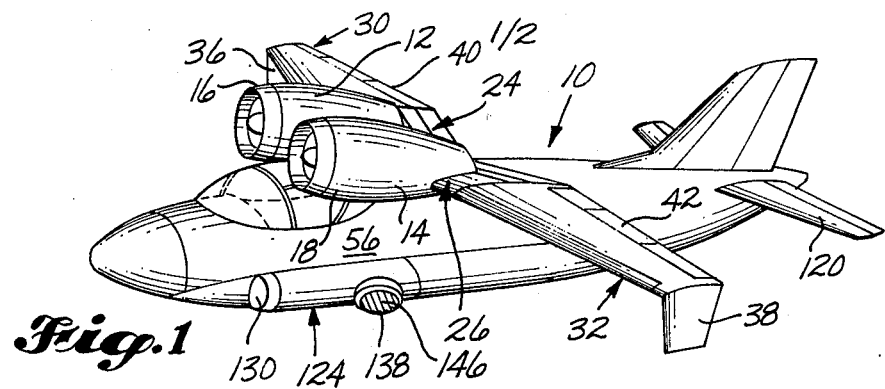
FIG. 1 is a pictorial view of a V/STOL and STOL type aircraft according to the invention.

Referring again to the drawings, there is shown a short takeoff and landing (STOL) and/or a vertical/-short takeoff and landing (V/STOL) aircraft, generally designated as 10. The aircraft has two upper jet engines 12 and 14, having nacelles 16 and 18 which are mounted on ascending portions 24 and 26 of gull-shaped wings 30 and 32. The wings have downwardly directed end portions 36 and 38 and flaps 40 and 42.

The engines, which may be the turbofan type, are positioned for upper surface blowing over the surfaces of the ascending portions 24 and 26 of the gull-shaped wings and over flaps 46 and 48 which are directly acted upon by the jet exhausts of the engines 12 and 14.

The engines are positioned closely inwardly to the longitudinal center of the aircraft and to cockpit 50 so that there is a minimum of critical engine out induced lateral moment.

Figure 4:
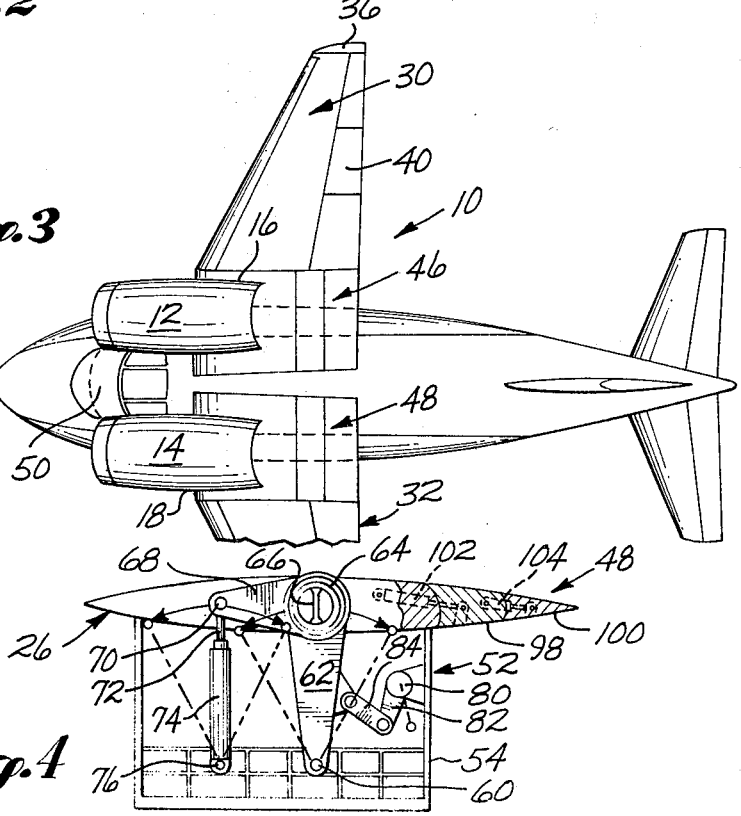
FIG. 4 is an elevational view of a variable incidence and translation device for tilting and translating the engines and wings, according to the invention.

Each of the wing portions 24 and 26 are connected, FIG. 4, to a wing variable incidence and translation device generally designated as 52. Each device 52 is fixed within a frame portion 54 within the fuselage 56 under a respective engine and ascending wing portion 24 and 26. Pivotally mounted to the lower part of each frame 54 at 60 is a wing and engine support bar 62, terminating at its upper end in a horizontal support member 64. The support members 64 are fixed within the wing portions 24 and 26 and are connected to the engine nacelles in each situation. A supporting bar 66 extends horizontally within the support 64. Extending forwardly from the supporting member 64 and fixed thereto is a bar 68, being pivotally connected at its forward end 70 to a piston rod 72, having its inner end and piston within an actuator 74, secured at its lower end in a pivotal connection 76 in the frame 54. The actuator 74 which is operable by fluid means, not shown, is adapted to tilt a respective wing on its support 62 and when the piston rod, as shown in FIG. 4, is caused to be extended.

A rotary actuator 80 is secured to the frame 54 at its rearward end, the actuator being driven by rotary means, not shown. Extending from the actuator is an arm 82 adapted to be pivotally moved upwardly and downwardly with respect to the center of the actuator, the link 82 being pivotally connected to a link 84 which in turn is pivotally connected to the support bar 62. Thus, when the rotary actuator is rotated counterclockwise the link 82 is moved rearwardly so as to translate a respective wing and engine (26, 14) as shown by the phantom outline 86 in FIG. 5. This moves the wing 26 rearwardly with respect to the center of gravity, indicated at 90.

At the same time, the engine and wing may be tilted upwardly by the actuator 74 by the extension of rod 72. When the rotary actuator 80 is rotated clockwise the link 84 pivots the support 80 to move the member 64 in the arc shown to move a respective engine forwardly with respect to the center of gravity as indicated by the phantom outline 94, FIG. 5.

The flaps 46 and 48 are in two parts 98 and 100, being deflected and raised by actuators 102 and 104 respectively, FIG. 4. Thus, when the wings are tilted and translated as shown in FIG. 5, the flaps 46 and 48 are deflected for takeoff and landing.

Figure 2:
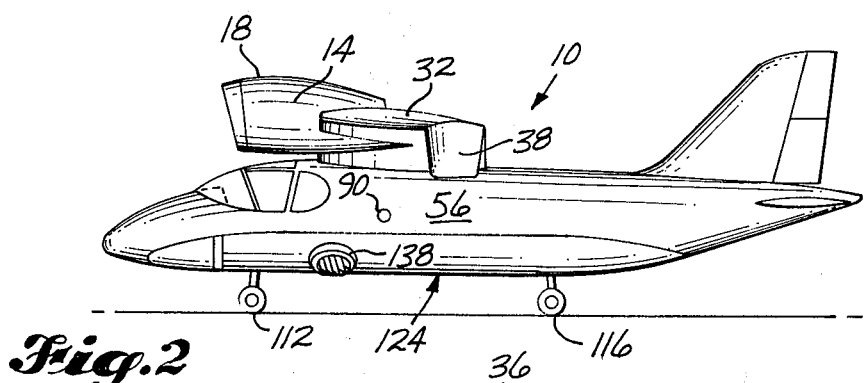
FIG. 2 is a side elevational view of the aircraft shown in FIG. 1.
Figure 3:
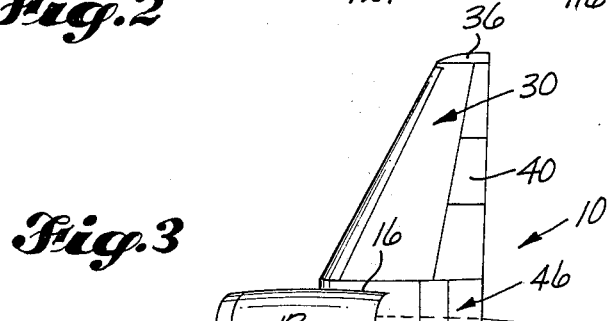
FIG. 3 is a fragmentary plan view of the aircraft shown in FIG. 1.

The capability, according to the invention, to vary the incidence and translate the wing allows the use of a light, short tandem landing gear having forwardly, spaced wheels 112 and 114 and rearward wheels 116, FIGS. 2 and 6. The variable incidence and translation device also provides for a smaller horizontal tail 120. This is made possible because the forward end of the aircraft and its forward landing gear 112, 114 need not be rotated upwardly when the aircraft takes off. The weight saving landing gear and smaller horizontal tail compensates for the variable incidence and translation mechanism 52.

At the lower sides of the airplane are lift/boost engines 124 and 126. They may be turbojet engines such as RB162. The engines 124 and 126 have inlets 130 and 132 which are closable by a rotary actuator 136 as indicated in FIG. 6. Each engine has swivel nozzles 138 and 140, respectively. The nozzles may be set in a ball and socket arrangement 142 so as to be rotatable by means of an actuator 144, FIG. 5, and in addition may have cascades 146 which may also be operated by the actuator to direct the flow of the exhaust which is also possible by means of the rotation of the exhaust in the ball and socket arrangement.

The wing tilt feature shown in FIG. 5 provides additional vectoring capability, indicated by the arrows 150, 152 and 154, needed for vertical takeoff and landing. In the arrangement shown, a 30° tilt provides a 110° vectoring when the flaps 48 are deflected as shown in FIG. 5. The wing translation, indicated by all three positions of the engine and wing in FIG. 5, provides center of gravity travel trim and critical engine out moment trim, shown in FIGS. 7-9, where the center of gravity is indicated longitudinally at 158.

The normal position of the aircraft is shown in FIG. 7 with the thrust vectoring of the upper engines 12 and 14 as indicted by the arrows 160 and 162. This is accomplished by a combination of the upper surface blowing and the wing tilt, FIG. 5, while the lower engines are vectored by the swiveling nozzles as indicated by the arrows 164 and 166.

In FIG. 8 where the engine 14 is out, the aircraft is laterally trimmed as shown by the ascending wing portion 24 in the horizontal position, the thrust vector of the engine 12 being indicated by the arrow 170. This position is maintained by a combination of airplane bank and the differential vectoring by the lower engines as indicated at 172 and 174.

Similarly, in FIG. 9 where the lower lift/boost engine 124 is out, the wing portion 26 is banked substantially upwardly and the wing portion 24 is banked slightly downwardly, that is, lower than its normal position. The three arrows 180, 182 and 184 indicate the thrust vectoring achieved as required by the engine 124 being out.

The engines 124 and 126 are not used during cruise flight, and the engines 12 and 14 in the normal horizontal positions are used for cruise flight along with the typical flaps 40 and 42.

The ability to translate the wings and engines provides for center of gravity trim, maneuverability pitch, and force trim when an engine is out.

The invention and its attendant advantages will be understood from the foregoing description and it will be apparent that various changes may be made in the form, construction, and arrangements of the parts of the invention without departing from the spirit and scope thereof or sacrificing its material advantages, the arrangement hereinbefore described being merely by way of example. I do not wish to be restricted to the specific forms shown or uses mentioned except as defined in the accompanying claims.

What is claimed is:

1. A short takeoff and short landing aircraft or vertical/short takeoff and vertical short landing aircraft, comprising:
   variable incidence wings, one on each side of the aircraft;
   at least one primary jet engine on each wing, each engine being positioned for upper surface blowing of the jet exhaust over the top of the wing;
   each engine having a nacelle fixed in a respective wing adapted to be tilted with the wing when its incidence is varied;
   incidence varying means in the aircraft adjacent each wing for respectively tilting each wing and its engine for takeoff and landing;
   flaps on said wings over which the engines exhaust and means in said wings to deflect said flaps for takeoff and landing; and
   translation means in the aircraft adjacent each wing for respectively translating each wing to provide center of gravity trim and engine out moment trim;
   said tilting of the wings and engine being from a generally horizontal cruise position to a thrust restored position.

2. The invention according to claim 1 in which:
   each translation means is associated with a respective incidence varying means.

3. The invention according to claim 1 including:
   laterally spaced lift/boost jet engines on lower side portions of the aircraft fuselage;
   nozzles of said lift/boost engines are rotatable and directed generally outwardly and downwardly;
   whereby thrust vectoring of the primary engines is accomplished by a combination of upper surface blowing and wing tilt, and thrust vectoring of lift-/boost engines is accomplished by rotation of their nozzles.

4. The invention according to claim 1 in which:
   the aircraft has a relatively light and short tandem landing gear and a relatively smaller horizontal tail, made possible by the variable incidence and translatable wings because nose wheel rotation of the aircraft is not required during takeoff.

5. The invention according to claim 1 in which:
   the respective incidence varying means and the respective translation means for each wing are supported adjacent respective wings in the aircraft;
   the incidence varying means including a pivotally mounted actuator being connected to rotate a support fixed within a wing and thereby tilt the wing;
   the translation means including a rotary actuator connected to said support fixed within a wing to translate said support and said wing forwardly and rearwardly.

6. The invention according to claim 1 in which:
   the wings are gull-shaped and the engines are positioned on the ascending parts of wings adjacent the fuselage.

7. The invention according to claim 1 in which:
   the wings are adapted to be tilted about 30° from the horizontal for takeoff by the incidence varying means, and
   by deflection of the flaps the takeoff thrust is vectored about 110°.

8. In a short takeoff and short landing aircraft or vertical/short takeoff and vertical/short landing aircraft, a method of controlling vertical takeoff and landing and short takeoff and landing trim and control moments, comprising:
   translating the wings and upper surface blowing engines thereon to provide center of gravity trim and critical engine out moment trim.

9. The method according to claim 8 including:
   thrust vectoring the upper surface blowing engines by a combination of upper surface blowing and tilting the wings, while vectoring lift/boost engine jet exhausts by directionally rotating the lift/boost nozzles,
   said lift/boost engines being horizontally spaced on the lower part of the fuselage.

10. The method according to claim 9 including:
    controlling engine out lateral trim by banking the airplane and differentially vectoring the lift/boost engines.

* * * * *